United States Patent [19]  [11] 4,383,065
Woo et al.  [45] May 10, 1983

[54] STABILIZED POLYPYRROLIDONE COMPOSITION

[75] Inventors: Gar L. Woo, Tiburon; Phillip H. Parker, San Rafael, both of Calif.

[73] Assignee: Chevron Research Company, San Francisco, Calif.

[21] Appl. No.: 220,575

[22] Filed: Dec. 29, 1980

[51] Int. Cl.³ .................... C08J 3/20; C08L 77/02; C08G 69/48
[52] U.S. Cl. .................................. 524/114; 524/196; 524/386; 524/387; 525/419; 525/420; 528/315; 528/326; 264/176 F
[58] Field of Search ............... 525/420, 419, 423, 424, 525/430; 528/315, 326; 264/176 F

[56] References Cited

U.S. PATENT DOCUMENTS

| | | | |
|---|---|---|---|
| 3,009,893 | 11/1961 | Barnes et al. | 260/30.2 |
| 3,026,301 | 3/1962 | Ney | 528/326 |
| 3,042,659 | 7/1962 | Follett | 528/326 |
| 4,071,486 | 1/1978 | Parker | 260/18 N |
| 4,076,696 | 2/1978 | Neafsey | 528/326 |
| 4,261,881 | 4/1981 | Woo | 260/45.85 N |

*Primary Examiner*—Harold D. Anderson
*Attorney, Agent, or Firm*—B. A. Newell; T. G. De Jonghe; L. S. Squires

[57] ABSTRACT

Poly-2-pyrrolidone polymer compositions having improved melt processability via the capping of at least a portion of the amino and/or carboxy end group of the polymer and the incorporation therewith of certain epoxide organic isocyanate and/or polyol additive compositions. The melt extrusion of such compositions is also disclosed.

13 Claims, No Drawings

STABILIZED POLYPYRROLIDONE COMPOSITION

BACKGROUND OF THE INVENTION

1. Field of the Invention

This invention relates to capped poly-2-pyrrolidone compositions having improved thermal stabilities and melt spinnability by virtue of the incorporation of certain additives. In another aspect, this invention relates to methods of melt extruding, and especially melt spinning, such compositions.

2. The Prior Art

Poly-2-pyrrolidone is produced by the alkaline-catalyzed polymerization of poly-2-pyrrolidone in the presence of carbon dioxide (see U.S. Pat. No. 3,721,652). Polypyrrolidone so-produced can be melt-spun into filaments by extrusion from multihole spinnerets. In melt-spinning, the polymer composition is extruded in a molten condition at a melt temperature which is generally greater than about 270° C. This extrusion must be carried out with care because of the propensity of the polymer to thermally degrade, reverting back to monomer. As well as causing substantial product loss and increasing process cost, this can also cause bubbles and the formation of voids or pox marks in the extrudate or filaments. Moreover, in addition to monomer reversion, molecular weight degradation also occurs during melt spinning resulting in poly-2-pyrrolidone filaments having substantially lower molecular weights than the original polymer. If the molecular weight of the initial polymer is too low or if the molecular weight degradation is too severe, the molecular weight of the filaments will be inadequate to afford the filaments sufficient tensile strength and fibrillation properties. (Mere molecular weight degradation in itself is not a significant problem unless the molecular weight is in fact degraded below the tensile strength-fibrillation limits.)

A further problem is that higher molecular weight (e.g., about 120,000 and above) polymers, although thermally more stable, are also more viscous and more difficult to extrude.

If extrusion is attempted at appreciably lower temperatures to avoid thermal decomposition, the material is not properly melted and fibers of substantially lower tensile strength are produced. Consequently, in order to melt extrude polypyrrolidone efficiently, one may either seek to increase the thermal stability of the polymer, or to improve the extrudability of the polymeric composition.

The unusual propensity of poly-2-pyrrolidone to thermally degrade back to its monomer and the adverse effect on melt spinning or melt extrusion is recognized to be a serious problem and the prior art has made a number of attempts to mitigate this problem. For example, U.S. Pat. No. 3,052,654 attempts to reduce degradation occurring during melt extrusion by pre-heating the poly-2-pyrrolidone to remove degradation products, e.g., pyrrolidone.

U.S. Pat. No. 3,026,301 teaches that the reaction of 2-pyrrolidone and hexamethylenediamine during polymerization produces a poly-2-pyrrolidone polymer having improved thermal stability but, that if the hexamethylenediamine is mixed with the poly-2-pyrrolidone after polymerization, no improvement is obtained.

U.S. Pat. No. 4,076,696 discloses that the addition of a small amount of certain alkylamines and alkyleneamines, including hexamethylenediamine, to poly-2-pyrrolidone permits the material to be extruded at a lower temperature and may be functioning as a slip agent.

U.S. Pat. No. 3,017,393 teaches that the melt extrusion degradation problem may be alleviated by washing or treating the polymer with an aqueous organic carboxylic acid solution and similarly, U.S. Pat. No. 3,072,615 teaches using dilute aqueous fatty acid.

U.S. Pat. No. 4,071,486 teaches that the thermal stability of poly-2-pyrrolidone can be improved by the addition of certain epoxides and U.S. Pat. No. 4,162,242 teaches that thermal stability may be improved by the addition of certain polyhydric alcohols.

U.S. Pat. No. 3,009,893 teaches that the problem may be reduced by the incorporation of relatively large amounts of certain substances, including certain polyols, which apparently function as melting point depressants permitting nylon-4 to be extruded at lower temperatures.

U.S. Pat. No. 3,549,580 discloses a process for preparing spinnable solutions of poly-beta-amides by the direct polymerization of beta-lactams (e.g., azetinone) in a neutral or weakly basic solvent, containing 0.9 to 50% wt lithium halides or lithium pseudo halides, in the presence of catalysts and optional activators. Dimethyl formamide is disclosed as a preferred solvent for economic reasons.

Japanese Pat. No. 43-27434 (1968) discloses a process for improving the thermal stability of polypyrrolidone which comprises treating polypyrrolidone with an alcohol in the presence of a strong inorganic acid or organic sulfonic acid and Japanese Pat. No. 44-23509 (1969) discloses a two-step process wherein the polymer is first treated with alcohol, in the presence of a strong acid, and then treated with a monoisocyanate.

Japanese Pat. No. 43-23637 (1968) discloses a process for improving the thermal stability of polypyrrolidone which comprises treating polypyrrolidone with an aqueous boric acid solution. Similarly, Japanese Pat. No. 43-130059 (1968) discloses a two-step process wherein the product of the boric acid treatment is treated with an organic isocyanate.

Also, while not concerned with thermal stability, U.S. Pat. No. 3,042,659 discloses a process for polymerizing 2-pyrrolidone which comprises polymerizing 2-pyrrolidone in a mixture containing a catalytic amount of an alkaline polymerization catalyst, a few percent of an N-monocarbonyl-2-pyrrolidone polymerization activator and various organic acid amides, including dimethyl formamide. This patent teaches that the N-monocarbonyl pyrrolidone when used in conjunction with certain organic amides, which are not themselves activators, are highly effective activators for the polymerization of 2-pyrrolidone and that the polymer product has a high molecular weight. The patent further teaches that the organic acid amides are not themselves activators but augment the activation activity of the N-monocarbonyl-2 pyrrolidone.

SUMMARY OF THE INVENTION

In our copending application Ser. No. 220,483 filed on even date herewith, which application is hereby incorporated by reference in its entirety, we disclosed certain novel capped polypyrrolidone compositions of moderate weight average molecular weight which have very good thermal stabilities. Also because of their lower weight average molecular weight and correspondingly lower viscosities these capped polymers have better melt spinnabilities and melt processability as compared with the higher weight average molecular weight polymers usually required by the art to meet thermal stability requirements.

We have now discovered that the thermal stabilities and spinnability of these capped polymers can be improved even further by the incorporation of certain additives. This is somewhat surprising as the thermal stability of the capped polymers is already so good as to thought to be limiting and incapable of further improvement.

In one embodiment, the invention provides a composition comprising a major amount of a capped poly-2-pyrrolidone composition in which a major portion of the polymer molecules are terminated at the carboxyl end group with an aminoalkylenol or an aminoalkylenamine group replacing the hydroxy group of said carboxyl end group and a minor amount, based on the poly-2-pyrrolidone composition of an epoxide and/or an organic isocyanate, and/or a polyol, effective to still further reduce thermal monomer reversion and/or molecular weight degradation and/or reduce the melting point of the polymer.

In another embodiment, the invention comprises a process which comprises melt extruding the compositions of the invention at extrusion melt temperatures in the range of about from 260° to 280° C.

The invention will be described in greater detail hereinbelow.

FURTHER DESCRIPTION OF THE INVENTION AND PREFERRED EMBODIMENTS

We have now discovered that by the addition of small amounts of organic epoxides and/or isocyanates and optionally certain polyols, that the thermal stability and melt spinnability of the capped polymer composition described in our copending application U.S. Ser. No. 220,483, cited above, can be even further improved. Typically, the epoxides and isocyanates, whether used singularly or in combination, are each added in amounts ranging from about 0.1 to 5% (based on the weight of polymer) and preferably about from 0.2 to 2%. The polyol is typically added in amounts ranging from about 0.5 to 10%, preferably about 3 to 7% and preferably is used in combination with the epoxide and/or isocyanate. The polyol appears to function as an extrusion lubricant thus facilitating extrusion and also afford some stabilizing benefit and in addition at higher concentrations act as melting point depressant.

In terms of both thermal stability and melt spinnability we have found that capped polymer compositions of the invention, containing about from 0.5 to 3% weight, based on the poly-2-pyrrolidone of an epoxide and about from 5 to 10% weight, based on the weight of poly-2-pyrrolidone of a polyol, afford especially good results especially where glycerol is used as the polyol and the epoxide an epoxyalkyl ether especially those having the formula

wherein R* is hydrogen or methyl and n is 6–10, preferably 8 or 9.

Suitable epoxides which can be used are, for example, described in U.S. Pat. No. 4,071,486 and include epoxides, containing less than sixty carbon atoms, having the formula:

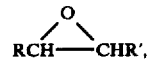

wherein R is hydrogen, alkyl or epoxyalkyl; R' is alkyl, polyalkylene oxide, epoxyalkyl, epoxypolyalkyl oxide, alkylester, epoxyalkylester, hydroxyalkyl or hydroxyalkylester.

The "polyalkylene oxide" of the polyalkylene oxide substituent and the epoxypolyalkylene oxide substituent, is preferably a polyethylene or polypropylene oxide having less than about 60 carbon atoms. The epoxypolyalkylene oxide is preferably an epoxide-terminated polyalkylene oxide substituent, in which case the preferred alkyl epoxide is commonly called a "polyalkyleneglycol diepoxide" or "polyglycol diepoxide". The "epoxyalkyl" of the epoxyalkyl substituent and the epoxyalkylester encompasses the aforementioned alkyl but has at least one oxirane ring functionally. The "epoxyalkyl" can also contain a small but appreciable amount of unepoxidized, nonaromatic, unsaturation due to incomplete epoxidation of the olefinic precursors. This unsaturation is insignificant. The "alkylester" of the alkylester substituent, the epoxyalkylester and the hydroxyalkyl ester can be a mono-, di-, or polyester moiety, such that the alkyl epoxide of this invention is an epoxidized mono-, di-, or polyester. Preferably, it is a mono-, di- or triester. Preferably the alkylester has fewer than about 60 carbon atoms. For example, such esters will include, epoxymethyloleate, epoxyhexyl linoleate, and epoxyoleic acid mono-, di-, or triglyceride; also glyceride-type esters, such as esters of glycidol; and hydroxyesters such as, epoxyricinoleate; and epoxidized esters of fatty acids or mixtures of esters of epoxidized fatty acids, including the glycerides such as, epoxidized soybean oil, epoxidized linseed oil, epoxidized sunflower oil, etc. Where epoxidized esters are used, epoxidized esters of $C_{16}$–$C_{20}$ fatty acids and $C_1$–$C_{10}$ alkanols are a preferred. Minor amounts of saturated fatty acid glycerides, such as, stearates and palmitates are also present in the naturally occurring glycerides, but these are not believed to offer a material advantage of disadvantage to the invention. The "hydroxyalkyl" substituents, including epoxyhydroxyalkyl substituents, including epoxyhydroxyalkyl substituents, are limited to fewer than 60 carbon atoms and preferably encompasses mono-, di- and trihydroxyalkyl or epoxyalkyl groups.

Typically, the alkyl epoxides used in the present invention have an oxirane oxygen content of from about 2–5 percent up to about 10–15 percent by weight.

The organic isocyanates which are generally useful additives in the present composition are those having a boiling point of at least 250° C. and having at least one isocyanate substituent and at least six carbon atoms.

Suitable organic isocyanates which can be used are, for example, described in commonly assigned copending application Ser. No. 36,474 filed May 7, 1980 now U.S. Pat. No. 4,261,881 and include, for example, alkyl isocyanates, cycloalkyl isocyanates; alkylcycloalkyl isocyanates; polycycloalkyl isocyanates and cycloalkyl-alkylene-dicycloalkyl isocyanates (I); aryl and alkylaryl isocyanates (II); polyether glycol isocyanates (III); and the like, such as, for example, represented by the following sub-generic formulas:

$$R(N=C=O)_n \text{ (I)}; \quad R^1(N=C=O)_n \text{ (II); and}$$

$$O=C=N-R^2-O[(CH_2)_{\overline{m}}CHR^6-O]_xR^3-N=C=O \text{ (III)};$$

wherein R is alkyl, having at least 6 carbon atoms; preferably from 6 through 27 carbon atoms, cycloalkyl, having from 6 through 8 carbon atoms; alkylcycloalkyl, having from 6 through 16 carbon atoms, polycycloalkyl having 6 through 24 carbon atoms or cycloalkyl-alkylene-cycloalkyl, having from 7 through 24 carbon atoms; $R^1$ is an aryl group having 6 through 27 carbon atoms or a mono or dialkyl aryl group having 7 through 27 carbon atoms; and preferably is phenyl; $R^2$ and $R^3$ are independently selected from the group consisting of alkylene or arylene each having 6 through 12 carbon atoms and alkylarylene having 7 through 14 carbon atoms, and preferably are independently selected from the group of phenylene, tolylene and xylylene; $R^6$ is hydrogen or alkyl having 1 through 6 carbon atoms (e.g., methyl); n is a whole integer of from 1 up to the maximum isocyanate saturation permitted by the particular R or $R^1$ group (typically n is in the range of from 1 through 4); m is a whole integer from 1 to 11; and x is a whole integer of from 1 to 100 and preferably from 5 to 20. Generally the monoisocyanates (n is 1) which have boiling points of at least 250° C. have at least ten carbon atoms.

Suitable polyols which can be used include, for example, polyhydric alcohol having an atmospheric boiling point of above 200° C., preferably above 270° C., and a melting point below 260° C. Suitable polyols, are for example, disclosed in U.S. Pat. Nos. 4,162,242 and 3,009,893, and include, for example, glycerol, pentaerythritol, trimetholethane, 1,5-dihydroxy-3-thiapentane. At concentrations of about 0.1 to 5% by weight, based on the weight of poly-2-pyrrolidone, the polyhydric alcohols function as slip agents and also afford some thermal stabilizing activity. At higher concentrations, e.g. above about 5 weight percent, typically about 10–30 weight percent, the polyhydric alcohols also reduce the melting point of the capped poly-2-pyrrolidone composition.

The capped poly-2-pyrrolidone composition used in the present invention is a modified poly-2-pyrrolidone in which at least a major portion (at least 50%) and preferably at least 80%, in terms of weight average molecular weight of the polymer molecules are terminated at the carboxyl end (see Definitions hereinbelow) with an -amino-alkylenol or aminoalkylenamine group replacing the hydroxy component of said carboxyl end. More specifically the aminoalkylenol and aminoalkylenamine have the formula

wherein Z is hydroxy or amino and $R^1$ and $R^2$ are independently lower alkyl or substituted lower alkyl having from one through three substituents independently selected from the group of amino and hydroxy and wherein the maximum total number of amino and hydroxy groups which can be attached to a single carbon atom is one amino group or one hydroxy group and wherein $R^1$ and $R^2$ taken together contain a sum total of from 0 through 3 amino and/or hydroxy substituents.

Such capped polymer molecules have a weight average molecular weight of about from 35,000 to 200,000 preferably about from 40,000 to 150,000 and more preferably about from 50,000 to 100,000 and generally have a dispersion ratio (i.e. weight average molecular weight divided by number average molecular weight) of about 1.5–3. The actual capped polymers can be generally represented by the following formula:

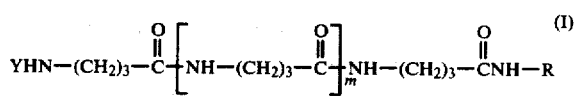

wherein m refers to average values and is a whole integer, typically at least about 200 and preferably about from 250 to 900; Y is hydrogen or formyl (i.e., —CHO); R is a radical having 2 through 12 carbon atoms having the formula —$R^1R^2Z$ wherein Z is hydroxy or amino and $R^1$ and $R^2$ are as defined hereinabove and preferably the $R^2$ carbon atom joining Z is a methylene carbon atom and more preferably the $R^1$ carbon atom attached to the nitrogen atom is also a methylene carbon atom.

For a given molecular weight, the polymers of formula I wherein R— is —$R^1R^2OH$ and/or Y is formyl, afford superior thermal stability (i.e., resistance to thermal molecular degradation and monomer generation) especially where both R— is —$R^1R^2OH$ and Y is formyl. The polymers of the invention wherein R— is —$CH_2CH_2OH$ have especially good thermal stability and melt processability. In the case where R— is —$R^1R^2NH_2$ the preferred polymers are those wherein R— is —$CH_2CH_2NH_2$ or —$(CH_2)_6NH_2$. Also the polymers wherein the carbon atom in $R^2$ attached to Z is methylene (i.e. R is —$R^3CH_2Z$, wherein $R^3$ is as defined for $R^1$ but has 1 through 11 carbon atoms) and more preferably wherein the $R^3$ carbon atom attached to the amide nitrogen is also methylene (i.e. R is —$CH_2(R^4)_{m'}CH_2Z$ where $R^4$ is as defined for $R^1$) but has 1 through 10 carbon atoms and m' is 0 or 1 have better thermal stabilities.

As described in our aforementioned copending application the aminoalkylenol capped polymers can be prepared by direct capping by contacting polypyrrolidone polymerizate (see formula A, in the Definitions given hereinbelow), preferably having a weight average molecular weight of about from 40,000 to 200,000; with an alkanolamine temperature in the range of about from 20° to 100° C., preferably about from 25° to 80° C., for about from 0.5 to 50 hours preferably about from 1 to 10 hours.

Both the aminoalkylenol capped polymers and the aminoalkylenamine capped polymers can be prepared by a cleaving-capping process by contacting poly-2-pyrrolidone (see formula B of the Definitions hereinbelow) preferably having a weight average molecular weight of about from 300,000 to 1,000,000, with an alkylenepolyamine and/or an alkanolamine under reactive conditions. This process is typically conducted at temperatures in the range of about 50° to 250° C., for about from 0.1 to 200 hours, preferably about from 0.5 to 20 hours. Where an alkanolamine is used, best results, in terms of product thermal stability, are typically obtained using temperatures in the range of about from 125° to 175° C. for about from 1 to 10 hours. Where an alkylenepolyamine is used, best results, in terms of product thermal stability, are typically obtained using temperatures in the range of about from 150° to 200° C. for about from 1 to 10 hours.

The formamido

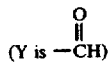
(Y is —CH)

capped polymer can be prepared by using polymerizate or poly-2-pyrrolidone which is already capped at the amine end with a formyl group.

Both of these procedures are described in detail, and illustrated by examples and starting material preparations in the before-cited copending U.S. application which procedures, examples and preparations are hereby expressly incorporated by reference.

The additives can be admixed with the capped poly-2 pyrrolidone by any suitable mixing procedure. For example, the materials can be conveniently mixed by coating pellets of capped poly-2-pyrrolidone with the additives before melt extrusion (e.g. melt spinning) or by pelletizing or kibbling the capped poly-2-pyrrolidone powder with the desired amount of the additive or additives. Where desirable, the additive can be dissolved in a solvent before being mixed (e.g. sprayed or slurried) with the poly-2 pyrrolidone and the solvent then removed (e.g., evaporated at low temperatures) prior to melt extrusion.

The improvement in thermal stability exhibited by the present compositions greatly facilitate the melt extrusion and particularly melt spinning of the compositions of the invention at temperatures in the range 260° to 285° C. and preferably less than about 280° C., and most preferably below 275° C. The use of melting point depressants such as, for example, polyols, such as glycerol, facilitates the use of lower extrusion temperatures, e.g. 260° to 270° C. The filaments obtained in accordance with the present invention generally possess superior filament textile properties (e.g., greater tenacity and reduced fibrillation).

The composition of the invention, although primarily designed to be used as filaments, can also be shaped into other shaped articles, such as, for example, films, sheets, containers, moldings, etc., can be extruded, moleded or cast.

Definitions

As used herein, the following terms have the following meanings unless expressly stated to the contrary.

The term "polymerizate" refers to the initial form of poly-2-pyrrolidone generally considered to have the general formula

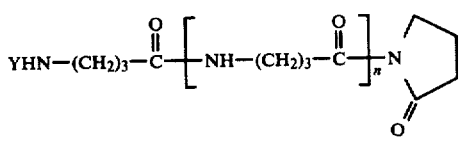
(A)

wherein n refers to average values and is typically a whole integer of about from 200 to 5000 and Y is hydrogen or formyl.

The pyrrolidonyl end groups are very labile and open under very mild conditions, such as upon contact with water at room temperature to the polymer having the formula

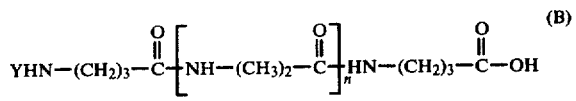
(B)

wherein n and Y are as defined in formula (A). Hence the most commonly encountered form of poly-2-pyrrolidone is represented by formula B and is and will be herein referred to as poly-2-pyrrolidone or polypyrrolidone or nylon-4. Also in both formulas A and B the lefthand terminated side is referred to as the amine terminated end and the righthand terminal side is referred to as the carboxyl terminated end.

The term "alkyl" refers to both straight-chain and branched-chain alkyl groups and includes alkylene. Typical alkyl groups include for example, methyl (or methylene, —CH$_2$—), ethyl, isopropyl, n-butyl, t-butyl, hexyl, decyl, tetradecyl, 4-methyl hexadecyl, eicosyl, and the like. The term "lower alkyl" refers to alkyl groups having from 1 through 6 carbon atoms.

The term "alkylene" when used as a radical refers to an aliphatic diradical, for example, —(CH$_2$)$_{n'}$— wherein n' is a whole number and branched alkylenes e.g.

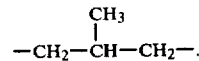

The term "arylene" refers to an aromatic group having two unsatisfied valances, for example, phenylene, 2-methyl phenylene and the like.

The term "alkoxy" refers to the group XO— wherein X is alkyl as defined hereinabove.

The term "cycloalkyl" refers to monocycloalkyl, dicycloalkyl and bicycloalkyl groups having 3 through 12 carbon atoms. Typical cycloalkyl groups include, for example, cyclopropyl, cyclopentyl, cyclohexyl, cyclooctyl, bicyclo[4.4.0]decane, 1,1'-bicyclopropane and the like.

The term "aryl" refers to the groups containing one or more phenyl groups and includes, for example, phenyl, biphenyls, and fused polyphenyls (e.g., naphthyl).

The term "alkylaryl" refers to "aryl" groups having one or more alkyl substituents as defined hereinabove. Typical alkylaryl groups include, for example, tolyl, 2,3-dimethylphenyl; 2-propylphenyl; 3-hexylphenyl, 2-methylnaphthyl; 2-methyl-8-decylnaphthyl, and the like.

The term "shaped articles" is a generic term referring broadly to one or more useful products which are commonly referred to as being made of plastic or in that context as synthetic (e.g., synthetic fibers). The term thus includes, for example, filaments, films, sheets, containers, moldings, equipment cases and parts, etc.

The term "pyrrolidone" or "monomer" refers to 2-pyrrolidone.

The terms "molecular weight" and "Mw", when used with reference to a polymer, refers to weight average molecular weight.

The "weight average molecular weight" is determined by solution viscosity using a 5% or 10% (e.g. 0.5 g/10 ml or 1/10 88% wt. HCO$_2$H) solution of the dried extracted polymer sample in 88% aqueous formic acid, and applying a Gardner viscosity molecular weight type relationship developed from specific viscosities of 0.1 g of known weight average molecular weight poly-2-pyrrolidone polymers in 100 ml of m-cresol at 25° C.

Where weight percents based on polypyrrolidone are given, these refer to the total weight of polypyrrolidone in the composition and include both capped and uncapped polypyrrolidone.

A further understanding of the invention can be had from the following non-limiting examples, wherein weight average molecular weights were determined by the immediately above-described procedure.

EXAMPLE 1

This example illustrates compositions of the invention and the improved thermal stability thereof.

The respective additives identified in Table I, hereinbelow were admixed (simple mixing) with monoethanolamine capped polypyrrolidone (formula I, Y is H, R is $-CH_2CH_2OH$, having a weight average molecular weight of about 105,000). The resulting compositions and also control compositions of the same capped polymer without additive were then tested for thermal stability. The compositions were tested on a Mettler FP-2 hot stage grid at 269° C. for 3 minutes. The samples were then extracted with water and weighed. Since 2-pyrrolidone is soluble in water, whereas poly-2-pyrrolidone is insoluble, the difference in weight between the initial sample and the extracted sample, represents the amount of 2-pyrrolidone generated by thermal degradation of the polypyrrolidone. The weight average molecular weight of the extracted sample was then determined by the solution viscosity method previously described. Two to four test samples were run for each composition. The averaged results of all the test samples run for that composition are reported in Table I, hereinbelow. It should be noted that the improvement in thermal stability is measured against the capped polymer of the present invention. Thus, in contrast to the 11% pyrrolidone generation which would normally be reported for an uncapped control sample of about the same weight average molecular weight the capped polymer control used in Table I only generated 6.9% pyrrolidone in the thermal test. Thus, any improvement shown by these compositions is very significant.

As can be seen from Table I in each case the use of the additve reduced the amount of pyrrolidone generated and in the case where two or more additives were used, the reduction in pyrrolidone generation was particularly outstanding.

TABLE I

| Additive, % | | | Pyrrolidone Generation | | |
|---|---|---|---|---|---|
| Epoxide[*1] | Glycerol | PEGD[*2] | % Formed | % Reduction[2] | Mw[*3] × $10^{-3}$ |
| — | — | — | 6.9 | — | 38 |
| 0.1 | — | — | 5.8 | 16 | 41 |
| 0.3 | — | — | 6.0 | 13 | 40 |
| 0.5 | — | — | 5.4 | 21 | 40 |
| 1.0 | — | — | 4.8 | 30 | 39 |
| 2.0 | — | — | 4.7 | 32 | 35 |
| 5.0 | — | — | 4.9 | 29 | 32 |
| 0.1 | 5 | — | 4.2 | 39 | 38 |
| 0.3 | 5 | — | 3.7 | 46 | 30 |
| 0.5 | 5 | — | 3.8 | 45 | 30 |
| 1.0 | 5 | — | 3.4 | 51 | 29 |
| 2.0 | 5 | — | 3.9 | 43 | 27 |
| 0.1 | 5 | 0.1 | 4.0 | 42 | 30 |
| 0.3 | 5 | 0.3 | 2.6 | 62 | 30 |
| 0.5 | 5 | 0.5 | 2.6 | 62 | 32 |
| 1.0 | 5 | 1.0 | 2.1 | 70 | 31 |
| 2.0 | 5 | 2.0 | 2.6 | 62 | 30 |

TABLE I-continued

| Additive, % | | | Pyrrolidone Generation | | |
|---|---|---|---|---|---|
| Epoxide[*1] | Glycerol | PEGD[*2] | % Formed | % Reduction[2] | Mw[*3] × $10^{-3}$ |
| 0.5 | — | 0.5 | 4.4 | 36 | 37 |
| 1.0 | — | 1.0 | 3.2 | 54 | 36 |
| 1.5 | — | 1.5 | 3.2 | 54 | 36 |

[*1] An alkylene oxide epoxide having the genral formula

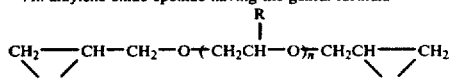

wherein n is 7 to 10 and R is H or lower alkyl, sold under the trademark DER-732 by Dow Chemical Company.
[*2] A polybutylene ether glycol diisocyanate

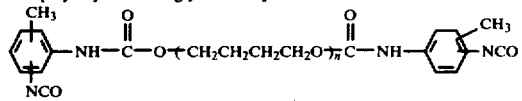

wherein n is a whole integer, sold under the trademark ADIPRENE L-213 by E. I. Dupont de Nemour & Co.
[*3] Weight average molecular weight.

EXAMPLE 2

This example illustrates further compositions of the invention and the improved thermal stability thereof.

The respective additive identified in Table I hereinbelow were admixed with a hexamethylenediamine capped polypyrrolidone (formula I, Y is H, R is $-(CH_2)_6NH_2$) having a weight average molecular weight of about 56,000. The compositions were then tested for thermal stability in the same manner as described in Example 1. The averaged results (2 to 4 tests per sample) are reported in Table II hereinbelow. It is again noted that the reduction in pyrrolidone generation is measured against the capped polymer and that an uncapped polypyrrolidone of about the same molecular weight (i.e. around 56,000) would generate about 14% pyrrolidone in the same thermal test.

As can be seen from Table II, the epoxide ether[*1] afforded a 33% reduction in pyrrolidone generation, and the isocyanate[*2] and the epoxymonoester each afforded about a 10% improvement. In this test the results for the $C_{15}-C_{18}$ monoepoxyalkyl were equivocal showing no improvement as compared with the capped polymer.

TABLE II

| Additive | % Wt. Additive | Pyrrolidone Generation | | Mw[3] × $10^{-3}$ |
|---|---|---|---|---|
| | | % Formed | % Reduction | |
| 0 | | 8.3 | | 33 |
| Epoxide[*1] | 2 | 5.3 | 37 | 60 |
| PEGD[*2] | 2 | 7.3 | 12 | 46 |
| Epoxyalkane[*3] | 2 | 8.5 | 0 | 34 |
| Epoxyester[*4] | 2 | 7.4 | 10 | 33 |

[*1] See footnote 1, Table I above
[*2] See footnote 2, Table I above.
[*3] Mixture of $C_{15}-C_{18}$ monoepoxyalkanes sold under the trademark Vikolox 15-18
[*4] An epoxymonoester sold under the trademark Vikolox 1110 by Viking Chemical Company.

EXAMPLE 3

This example further illustrates the compositions of the invention and the improved thermal stability thereof.

The respective additives, identified in Table III hereinbelow, were admixed, in the specified concentration, with a hexamethylenediamine-capped polypyrrolidone having a weight average molecular weight of about 56,000 (formula I, Y is H, R is —(CH$_2$)$_6$NH$_2$).

The compositions were tested for thermal stability in the same manner as described in Example 1 and the results averaged and reported in Table III hereinbelow, the reduction in pyrrolidone generation is again measured against a hexamethylenediamine capped polymer. An uncapped polypyrrolidone of about the same molecular weight generates about 14% pyrrolidone in the same thermal test.

As can be seen from Table III, a very substantial improvement (reduction) in pyrrolidone was obtained, where the alkylene oxide was used. But where the monoepoxyalkane was used no improvement (reduction) in pyrrolidone was observed though some improvement in molecular was observed. Thus, it is generally preferred to use other epoxides than monoepoxyalkanes.

TABLE III

| Additive, % | | | Pyrrolidone Generation | | |
|---|---|---|---|---|---|
| | Glycerol | PEGD*$^2$ | % Formed | % Reduction$^2$ | Mw$^3$ × 10$^{-3}$ |
| Epoxide*$^1$ | | | | | |
| — | — | — | 8.3 | — | 33 |
| 0.5 | — | — | 7.3 | 12 | 36 |
| 1.0 | — | — | 6.5 | 22 | 41 |
| 2.0 | — | — | 5.3 | 36 | 60 |
| 0.5 | 5.0 | — | 5.9 | 29 | 30 |
| 1.0 | 5.0 | — | 5.1 | 39 | 31 |
| 2.0 | 5.0 | — | 4.6 | 45 | 53 |
| 0.5 | 5.0 | 0.5 | 5.3 | 36 | 29 |
| 2.0 | 5.0 | 2.0 | 2.6 | 69 | 32 |
| Epoxyalkane*$^3$ | | | | | |
| 2 | — | — | 8.5 | — | 34 |
| 2.0 | 5 | 2.0 | 9.2 | 11 | 32 |
| 0.5 | — | 0.5 | 8.2 | — | 40 |
| 1.0 | — | 1.0 | 8.0 | — | 49 |
| 2.0 | — | 2.0 | 8.3 | — | 57 |

*$^1$See footnote 1, Table 1
*$^2$See footnote 2, Table 1
*$^3$See footnote 3 of Table II hereinabove.

Obviously many modification and variations of the invention, described hereinabove and below in the claims, can be made without departing from the essence and scope thereof.

What is claimed is:

1. A composition comprising a major amount of a normally solid poly-2-pyrrolidone having a weight average molecular weight of about from 35,000 to 100,000 in which at least a major portion of the carboxyl end groups are modified by replacement of hydroxy radical in said carboxyl end group with a capping radical selected from the group consisting-aminoalkylenamine, and a minor amount, effective to improve the melt processability of said modified poly-2-pyrrolidone of an additive, having a boiling point of at least 260° C. and a melting point below about 250° C., selected from the group consisting of epoxides having 2 through 60 carbon atoms and having at least one epoxy oxygen radical linking adjacent carbon atoms; polyhydric alcohols; organic isocyanates having at least 6 carbon atoms; and mixtures thereof and wherein the alkylene moiety of said capping radical has at least two carbon atoms separating the -amino moiety thereof from the end amine moiety thereof; and wherein said weight average molecular weight is determined by solution viscosity using a solution containing 0.50 or 1.0 grams of the dried extracted polymer in 10 ml of 88% aqueous formic acid, and applying a Gardner viscosity molecular weight type relationship developed from specific viscosities of 0.1 g of known weight average molecular weight poly-2-pyrrolidone polymers in 100 ml of m-cresol at 25° C.

2. The composition of claim 1 wherein said capping radical has the formula

—NH—R$^1$R$^2$Z wherein R$^1$ and R$^2$ are independently selected from the group of lower alkylene or substituted lower alkylene having 1 through 3 amino substituents and wherein each carbon atom thereof has a maximum of one amino radical, Z is amino and wherein the sum of the amino radicals in said capping radical is a whole integer from 2 through 5.

3. The composition of claim 2 wherein said capping radical is selected from the group having the formula

—NHR$^3$CH$_2$Z wherein Z is as defined hereinabove and R$^3$ is as defined for R$^1$ in claim 2 but has 1 through 11 carbon atoms.

4. The composition of claim 2 wherein said capping radical has the formula —NHCH$_2$—(R$^4$)$_{m'}$—CH$_2$Z wherein R$^4$ is as defined for R$^1$ in claim 2 but has 1 through 10 carbon atoms, m' is 0 or 1 and Z is as defined in claim 2.

5. The composition of claim 1 wherein said epoxide has the formula

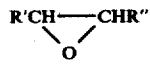

wherein R' is hydrogen, alkyl or epoxyalkyl and R" is alkyl, polyalkylene oxide, epoxyalkyl, epoxypolyalkylene oxide, alkylester, epoxyalkylester, hydroxyalkyl or hydroxyalkylester and wherein the ester moiety of said alkylester, said epoxyalkylester, and said hydroxyalkylester is a mono-, di- or triester.

6. The composition of claim 5 wherein said composition contains an amount in the range of about from 0.5 to 10 weight percent, based on the weight of total poly-2-pyrrolidone, of said polyhydric alcohol.

7. The composition of claim 5 wherein said composition contains about 3 to 7 weight percent of said polyhydric alcohol, about 0.2 to 2 percent of said epoxide and about 0.2 to 2 percent by weight of said organic isocyanate and wherein said organic isocyanate is a polybutylene ether glycol diisocyanate; and wherein weight percents are based on the total weight poly-2-pyrrolidone, in said composition.

8. The composition of claim 5 wherein R" is polyalkylene oxide or epoxypolyalkylene oxide.

9. The composition of claim 1 wherein said composition contains an amount in the range of about from 0.1 to 5 weight percent, based n the weight of total poly-2-pyrrolidone in said composition, of said epoxide effective to improve the thermal stability of said composition and wherein said epoxide is an epoxy ether having the formula

wherein n' is 6 through 10 and R$^5$ is hydrogen or methyl.

10. The composition of claim 9, wherein said polyhydric alcohol is glycerol.

11. The composition of claim 9 wherein said composition contains about from 0.5 to 3 weight percent of said epoxide and about from 5 to 10 weight percent of said polyhydric alcohol, and wherein the weight percents are based on the total weight of poly-2-pyrrolidone.

12. The composition of claim 1 wherein said capped poly-2-pyrrolidone has a weight average molecular weight of about from 35,000 to 100,000 and has the formula

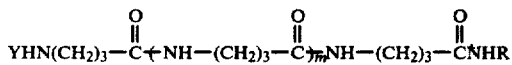

wherein R is a radical having the formula $-R^1R^2Z$ wherein Z is amino and $R^1$ and $R^2$ are independently selected from the group of lower alkylene or substituted lower alkylene having 1 through 3 amino substituents and wherein the total of the sum of the substituents in $R^1$ plus $R^2$ is from 0 through 3 and wherein each carbon atom in said radical has a maximum of one amino substituent including Z; Y is hydrogen or formyl; and m is a whole integer of at least about 200;

and wherein said weight average molecular weight is determined by solution viscosity using a solution containing 0.50 or 1.0 grams of the dried extracted polymer in 10 ml of 88% aqueous formic acid, and applying a Gardner viscosity molecular weight type relationship developed from specific viscosities of 0.1 g of known weight average molecular weight poly-2-pyrrolidone polymers in 100 ml of m-cresol at 25° C.

13. The composition of claim 12 wherein Y is formyl.

* * * * *